United States Patent [19]
Ando

[11] Patent Number: 6,032,125
[45] Date of Patent: Feb. 29, 2000

[54] DEMAND FORECASTING METHOD, DEMAND FORECASTING SYSTEM, AND RECORDING MEDIUM

[75] Inventor: Hideyuki Ando, Oita, Japan

[73] Assignee: Fujitsu Limited, Kawasaki, Japan

[21] Appl. No.: 08/955,663

[22] Filed: Oct. 22, 1997

[30] Foreign Application Priority Data

Nov. 7, 1996 [JP] Japan ................................. 8-295499

[51] Int. Cl.[7] ............................ G06F 15/18; G06F 17/60
[52] U.S. Cl. ................................ 705/10; 705/7; 705/28; 706/21
[58] Field of Search ..................... 705/10, 14, 28, 705/7; 707/2; 702/3; 706/45, 14, 15, 931, 20–21; 379/113, 133, 309, 352

[56] References Cited

U.S. PATENT DOCUMENTS

| 5,155,763 | 10/1992 | Bigus et al. | 379/113 |
| 5,537,590 | 7/1996 | Amado | 707/2 |
| 5,774,868 | 6/1998 | Cragun et al. | 705/10 |
| 5,796,611 | 8/1998 | Ochiai et al. | 702/3 |

FOREIGN PATENT DOCUMENTS

| 5-151234 | 6/1993 | Japan . |
| 8-16950 | 2/1996 | Japan . |

*Primary Examiner*—James P. Trammell
*Assistant Examiner*—Cuong H. Nguyen
*Attorney, Agent, or Firm*—Staas & Halsey

[57] ABSTRACT

A method and a system for forecasting the demand agreeing with the fluctuation trend of sales results at high and stable precision, without requiring user's maintenance, by using a model optimum for grasping the fluctuation trend of sales results, even if the products are diverse, by storing a plurality of models of neural network, for example, a model for forecasting the demand from data of the past several months, a model for forecasting the demand from data of the same period of the previous year, and a model for forecasting the demand from both the latest data and data of the same period of the previous year, and also by feeding sales results into a model of neural network to make it learn by the short period such as by the week, and a recording medium in which is recorded such program.

22 Claims, 8 Drawing Sheets

DEMAND FORECASTING METHOD, DEMAND FORECASTING SYSTEM, AND RECORDING MEDIUM

BACKGROUND OF THE INVENTION

The present invention relates to a method and system for forecasting the demand for products from the fluctuation trend of sales results on the basis of the sales results of products, and a recording medium in which is recorded a computer program for demand forecasting.

In the manufacturing and distributing industries, always supplying products in response to the demand of consumers by a minimum stock to reduce the stock cost and distribution expenses will lead to reduction of the sales unit price of products and enhancement of the profit rate. It is therefore necessary to forecast the product demand precisely, and determine the sales plan, production plan, and distribution plan according to the demand trend of consumers.

In a conventional system for forecasting the product demand and determining the sales plan, on the basis of characteristics of the sales results, including the sales demand of individual products, component ratio of the sales, and profit rate, the index showing ease of sales promotion of individual products is calculated by a fuzzy operation where the knowledge (rule) of an expert in sales plan about analysis of fluctuation trend of sales results is utilized, and the sales forecasting result of individual products on the basis of this index is displayed, so that the user interface for determining the sales plan efficiently is presented (Japanese Patent Application Laid-open No. 5-151234).

In another proposed system, the sales amount of each product is collected from a sample shop extracted from plural shops, the sales amount in all shops is presumed from the sales amount in the sample shop on the basis of the sales amount ratio in the sample shop to the sales amount in all shops and the characteristics of commodities of the sample shop (price zone, target customer age, selling technique etc.), while sales transition patterns of plural types and final sales estimated amount on the basis of the past transition of sales results are stored, and a pattern similar to the estimated transition pattern of sales amount of all shops is selected from the stored sales transition patterns, and the final sales estimated amount is regarded as the sales estimated amount of the commodities, and the production is planned accordingly (Japanese Patent Publication No. 8-16950).

Thus, in the conventional methods of forecasting the demand by analyzing the trend of the past sales results, it is the main goal to apply the statistical analysis techniques, such as time series forecasting where algorithm of forecasting the knowledge and condition of analysis of fluctuation trend of sales results are described in a form of rule, and econometric modeling.

However, if the product trend changes in a short cycle, as often experienced recently, the data used in analysis rapidly becomes old and the precision of forecasting lowers. Therefore, in order to keep a high precision in forecasting, the maintenance of software of the above-mentioned algorithm, knowledge and condition is required frequently. It, however, demands a long time and expertness to describe the techniques of forecasting in a form of rule depending on abundant experiences and intuition of an expert, and hence the maintenance must depend on experts and is difficult.

SUMMARY OF THE INVENTION

The invention is devised to solve the above problems, and it is hence an object thereof to present a method and system for forecasting the demand depending on the fluctuation trend of sales results stably and at high precision by using a model optimized for grasping the fluctuation trend of sales results, even if the products are diverse, by storing a plurality of models of neural networks, for example, a model for forecasting the demand from data of the past several months, a model for forecasting the demand from data of the same period of the previous year, and a model for forecasting the demand from both the latest data and data of the same period of the previous year, and a recording medium in which is recorded a computer program for the demand forecasting.

It is also an object to present a demand forecasting method and system for feeding sales results into a model of a neural network to have it learn by a short period such as weekly, predicting the demand depending on the variation trend of sales records, and thereby obtaining high forecasting precision stably without the maintenance by the user, and a recording medium in which is recorded a computer program for the demand forecasting.

According to the invention, by feeding the sales results in a certain period, the neural network learns so as to obtain an output close to the sales results of a certain later period, that is, an output suited to the fluctuation trend of sales results, high forecasting precision is obtained stably without the maintenance by the user because it is possible to forecast the demand suited to the fluctuation trend of sales results of the product.

Moreover, when handling diverse types of products differing, for example, in the fluctuation trend of sales results, such as those almost unchanged in fluctuation trend of sales results throughout the year, and those changing in the fluctuation trend of sales results in a short period of several months, a model suited to the pattern of the fluctuation trend of sales results can be selected from plural models, so that the demand can be forecast stably and at high precision according to the fluctuation trend of sales results.

Also in the invention, the model incorporates the position data indicating the position on the calendar, such as which week of a year, as a processing element, and this position data is fed into the neural network together with the sales results.

Therefore, as the position data indicating the period of sales results, the calendar data generally created by the computer or work station can be utilized, and hence the demand can be forecast by the time series data without feeding data from outside by the user specially for demand forecasting.

Moreover, in the invention, the sales results of 13 months, dating back from the learning point, including the sales results of one month of the same period of the previous year, which is used in learning of neural network is obtained.

It is therefore not necessary to secure a tremendous amount of data such as data for 3 years, for analysis of fluctuation trend of sales results. On the contrary, old data which hinders grasping of fluctuation trend of sales results is eliminated from the data for demand forecasting, and high precision of demand forecasting is obtained.

In another feature of the invention, as the daily demand forecasting value is used in weekly demand forecasting, and the weekly demand forecasting value is used in monthly demand forecasting, for example, the demand of a first period unit forecast by the neural network is reflected in the demand forecasting of a second period unit composed of a set of the first period units.

Accordingly, from among the monthly long-term prediction, weekly medium-term forecasting and daily short-term forecasting, the forecasting values of the term suited to the planning level of production and distribution of products can be presented to the users.

The above and further objects and features of the invention will more fully be apparent from the following detailed description with the accompanying drawings.

DETAILED DESCRIPTION OF THE INVENTION

Figure 1:
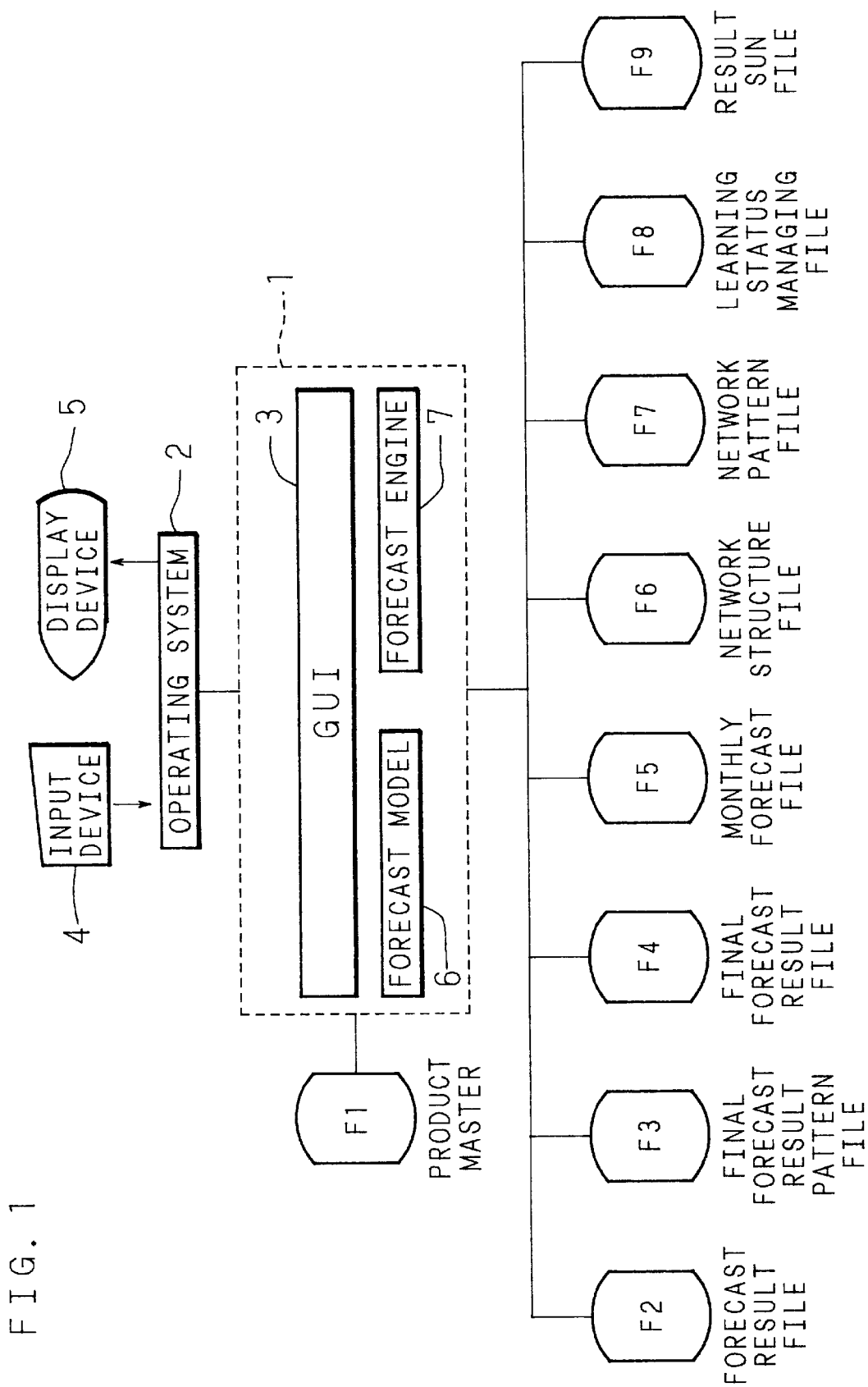
FIG. 1 is a function block diagram of demand forecasting system according to the invention.

FIG. 1 is a function block diagram of the demand predicting system according to the invention.

This system 1 enclosed by dotted line works on a personal computer or work station loading an operating system (OS) 2 such as MS-WINDOWS 95 (Microsoft Corp., United States) which presents the graphical user interface (GUI) for enhancing ease of operation.

To the system 1, an input device 4 such as a mouse and a keyboard, and a display device 5 for outputting the forecasting result are connected.

As a forecast model 6, plural forecasting models of neural network (hereinafter network) are defined, such as a model for forecasting the demand from the data of the past several months, a model for forecasting the demand from the data of the same period of the previous year, and a model for forecasting the demand from both the recent data and data of the same period of the previous year. In the forecast model 6, the structure of the network composed of many coupled neurons and the combination of an input pattern to the network and the corresponding output pattern composed of elements having greater effects out of elements having causal relation between the demand, in this example, sales records, and of the time series data of the week number indicating the week position (which week) on the calendar are defined.

The week number may be expressed as either "Xth week of the year" or "Xth week of Yth month". Or, instead of the week number, the calendar data such as M/D/Y (month/day/year) may be directly used.

Forecast engine 7 is nucleus of the system for performing learning and demand forecasting utilizing a group of files F1–F9 which will be described later. The forecast engine 7 is composed of programs in which the construction to develop the forecasting model for forecasting the demand, control sequence of learning and demand forecasting sequence are described (see FIG. 3 through FIG. 6).

GUI 3 includes EXCEL (spreadsheet software of Microsoft Corp., United States) and Visual Basic (VB: programming tool by Microsoft Corp., United States), and it is programmed by the VB to arrange parts for creating tables and graphs in windows, designate the attributes, and describe the process for an event such as clicking of the mouse.

The GUI 3 provides the user with the interface for supporting tasks for determining the production or distribution plan from the demand forecasting data obtained by using the forecasting models, such as a change of forecasting value to a planning value by an operation of the input device 4 on the tables or graphs displayed in the window of the display device 5.

As a user interface, the GUI 13 presents the function of analysis of fluctuation trend of sales results such as a comparison function with the past data, and a monitoring function of forecasting precision by displaying the error of the forecasting value from the actual value in percentage or by a graph. The user can correct the future demand forecasting by an operation of the input device 4 such as a mouse, making reference to such data.

Figure 2:
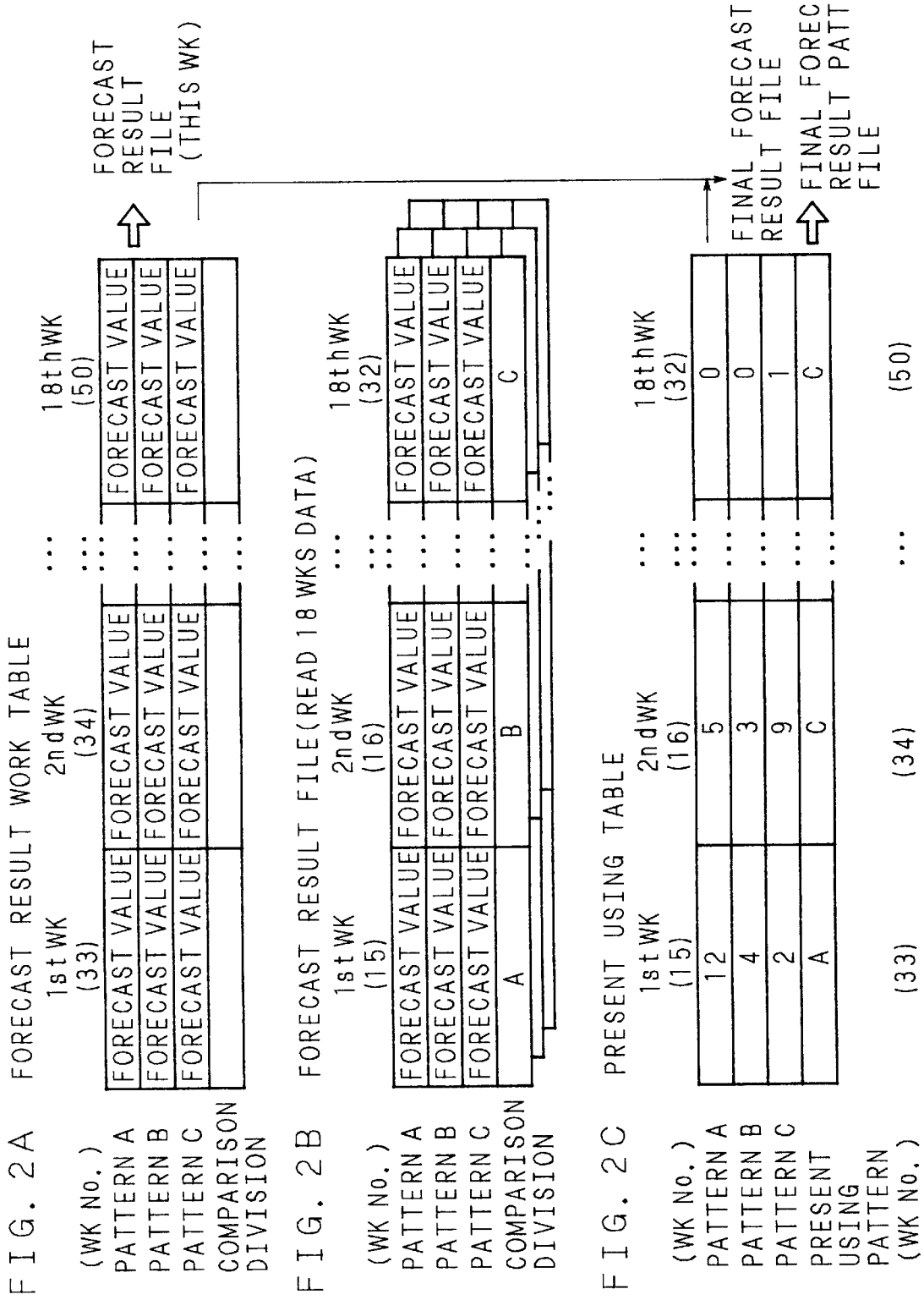
FIGS. 2 A to 2C are conceptual diagrams showing the process of demand forecasting.
Figure 4:
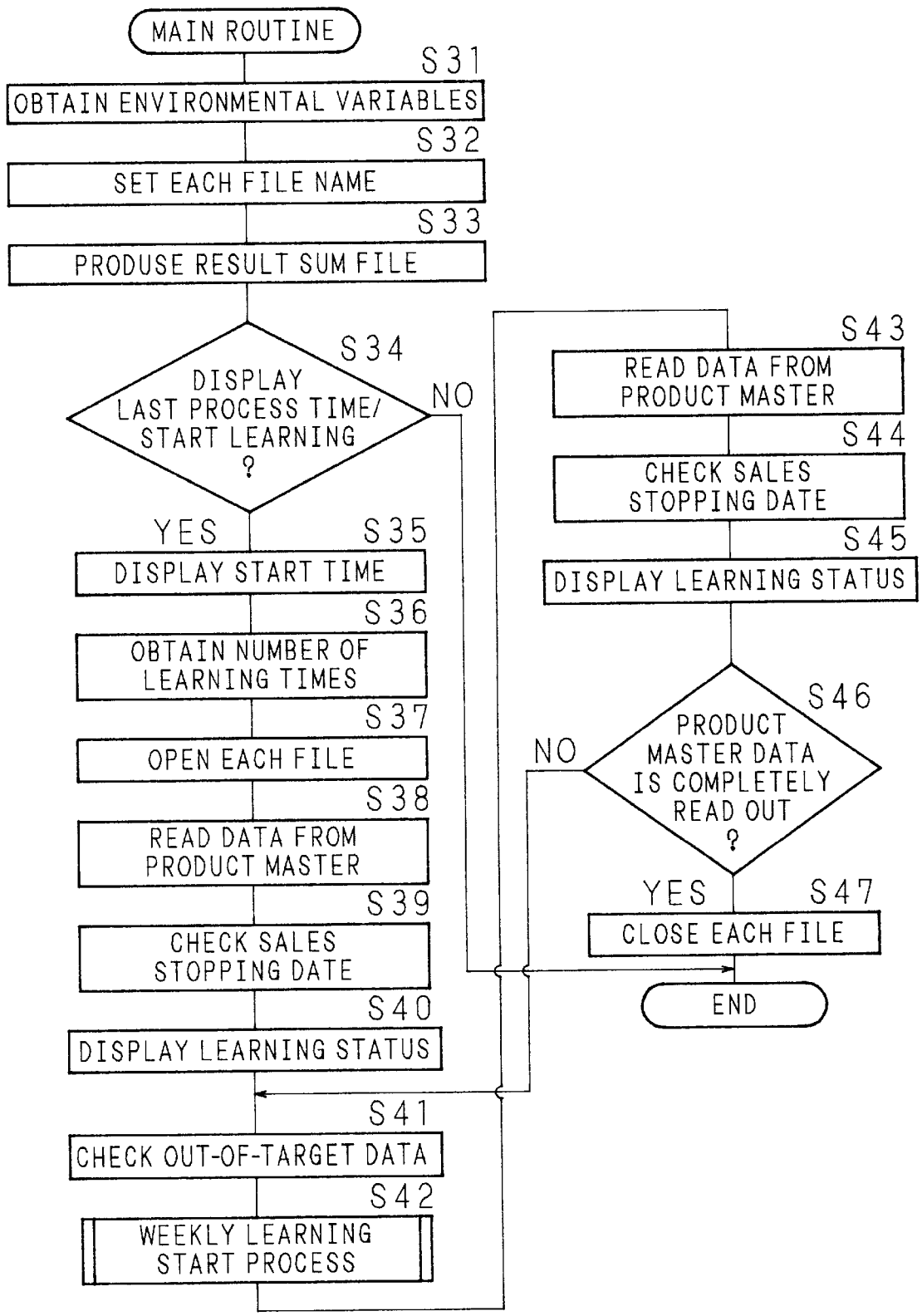
FIG. 4 is a flowchart of weekly learning process (1)
Figure 5:
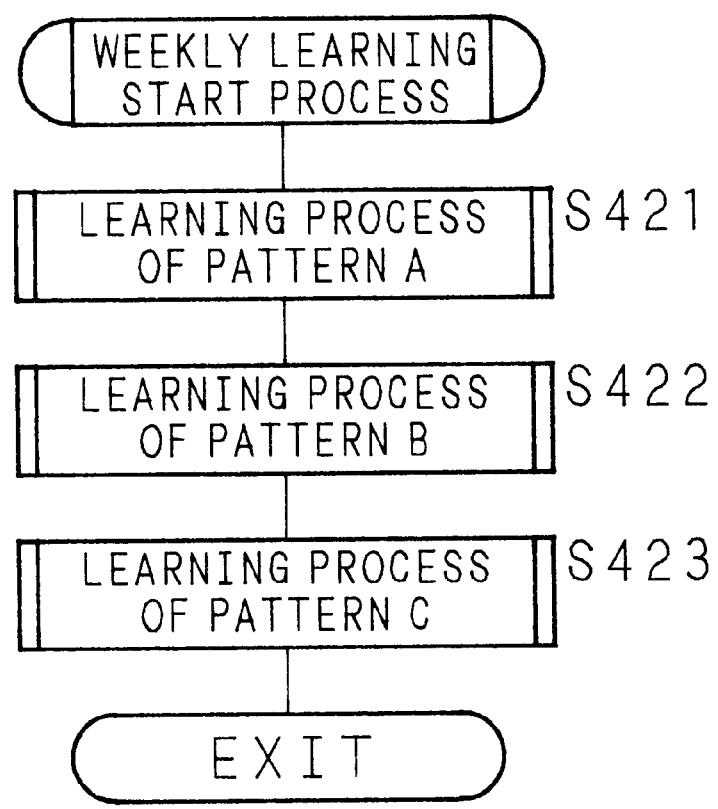
FIG. 5 is a flowchart of weekly learning process (2)

The procedure of weekly demand forecasting in such a demand prediction system is described below according to a practical example of a table in FIG. 2, and a flowchart in FIG. 3, and the learning procedure prior to the weekly forecasting is explained according to flowcharts in FIG. 4 through FIG. 6. In this example, three models, patterns A, B, C are prepared as forecasting models. In this example, the weekly forecasting is explained, but the frequency of forecasting is not limited to the weekly forecasting, but may include daily or monthly forecasting. Similarly, the learning frequency is not limited to the weekly learning.

Prior to explanation of the procedure, the contents of each file used in the demand forecasting system is described below.

The product master F1 stores the 13-month sales results by a product read by an OCR (optical character reader) at the retail shop and transferred as in the POS system (point-of-sales system) together with the product code, marketing date (sales start date), sales stop date and stock amount.

In the forecast result file F2, the forecasting value of each week for 18 weeks generated by the network of patterns A to C is stored by pattern as the demand is forecast every week.

The final forecast result pattern file F3 is a file, as will be described later in detail by a table in FIG. 2, storing the using pattern of every week in 18 weeks in future and the forecasting values by the patterns, which are selected on the basis of the comparison result of the forecasting result and real sales results in the last 18 weeks. Every time the final forecast result pattern file F3 is newly created at the time of forecasting, the final predict result pattern file F3 of 18 weeks before is deleted. Then, the final forecast result pattern file F3 of this time is stored as the previous final forecast result pattern file F3.

A final forecast result file F4 stores only the end result value of weekly forecasting value by the selected using pattern of this time. This predicted value is presented to the user by using the GUI 3.

A monthly forecast file F5 stores the summed value of weekly demand forecasting of one month as the demand forecasting value of the month.

In a network structure file F6, every time the network of patterns A to C learns, the network structure is stored by pattern. The network structure may be changed by learning.

A network pattern file F7 stores the combination pattern of input and output data used in learning of network of each of patterns A to C.

A learning status managing file F8 stores the learning status of the network by network, such as the learning date, learning start time, learning end time, the number of learning times, the number of entered patterns, the number of convergence patterns, average error, maximum error, and maximum error pattern name.

A result sum file F9 is a file created when the network learns, and it is a file for storing the sales results of each product acquired from the product master F1 according to the requirement of the forecasting model.

Figure 3:
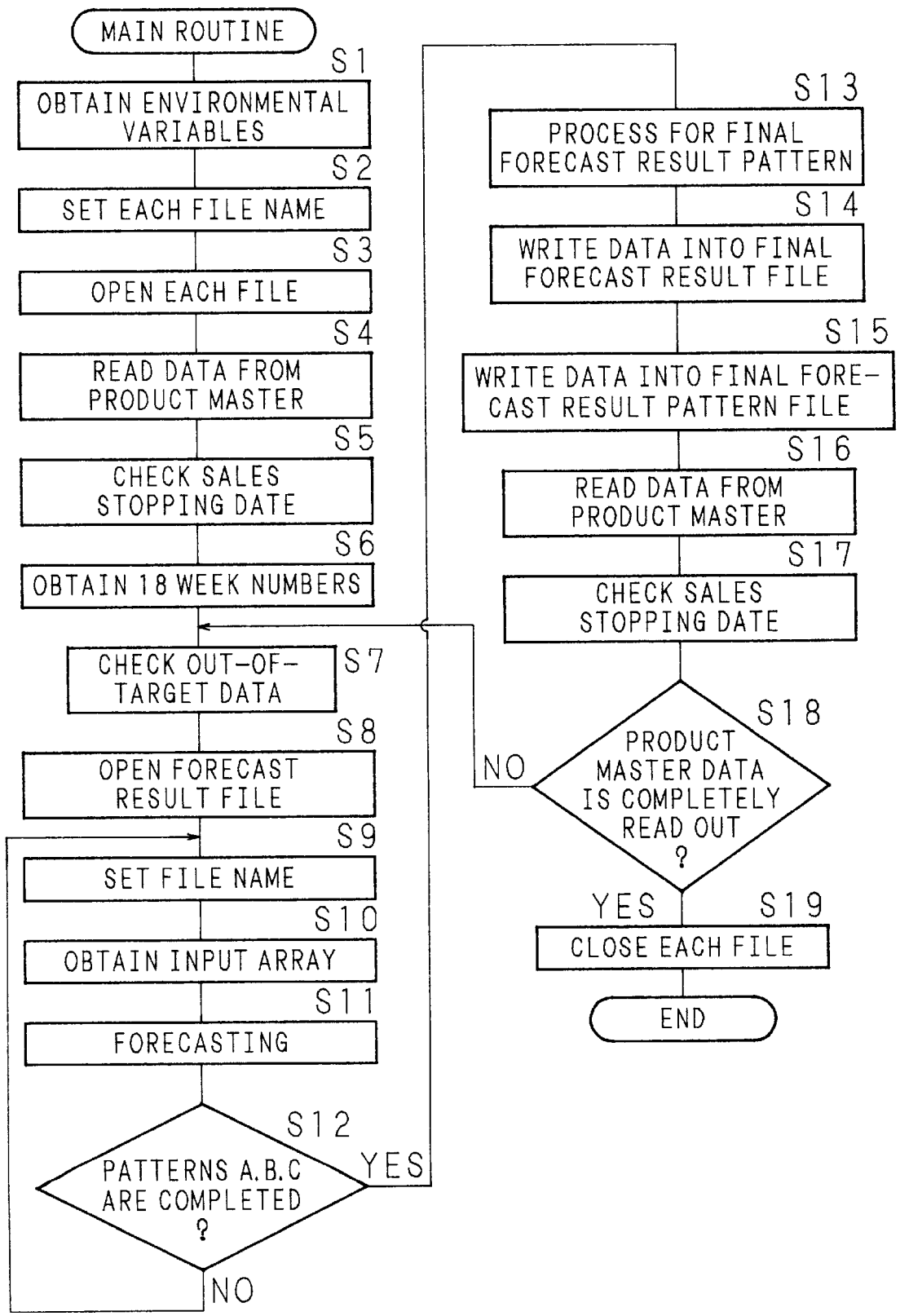
FIG. 3 is a flowchart of weekly forecasting process.

First, weekly forecasting shown in FIG. 3 is described.

Variables of the operating environments of the demand forecasting system are obtained (S1), each file name of the files used in demand forecasting (final forecast result pattern file F3 of this time, final forecast result file F4, forecast result file F2, monthly forecast file F5) is set (S2), and each file is opened (S3). The product code, marketing date, and sales stopping date of the product as the target of demand forecasting are read from the product master F1 (S4). Checking the sales stopping date among the read data (S5), the product is considered to be out of the target of forecasting if the sales stopping date is included in the current week.

Obtaining the weeks numbers of the last 18 weeks used in selection of the using pattern and of the future 18 weeks for forecasting the demand (S6), and if the sales results data is not present, it is out of the target of forecasting (S7).

Opening the predict result file F2 (of the current week), the region of the predict result work table is saved on the memory (S8). Each file name of the network structure file F6 and network pattern file F7 of pattern A is set (S9). Obtaining a pattern of an input array to be input into the network from the network pattern file F7 (S10), forecasting is processed by pattern A (S11). The above steps S9 to S11 are similarly repeated for pattern B and pattern C (S12), the final forecasting result for 18 weeks ahead of the current week and the using pattern of this time are determined, and the forecasting result of the current week by pattern is obtained (FIG. 2A).

Consequently, the process for obtaining the final forecasting result pattern is executed in the following procedure (S13). Reading the forecast result files F2 for the past 18 weeks sequentially, the forecasting value by each pattern for 18 weeks obtained by demand forecasting conducted every week is compared with the actual sales results value of every week, and the pattern outputting the forecasting value closest to the actual sales results value is extracted and obtained as the pattern of a comparison division (FIG. 2B).

As a result of the comparison between the forecasting values for 18 weeks and the actual sales results values, the number of times the appearance of a pattern in the demand forecasting in every week extracted as the comparison division is summed in the column of each week of the present using table in (FIG. 2C), and the most frequently appeared pattern in the forecasting in the past 18 weeks is picked up as the present using pattern of the future 18 weeks.

The forecasting values of the first to 14th weeks forecast by the present using pattern thus selected are selected from the forecasting result work table (FIG. 2A), and written into the final forecast result file F4.

In the final forecast result pattern file F3, the final forecasting results of the first to 14th weeks, and the present using pattern are written (S15).

The product code, marketing date, and sales stopping date of the next product are read in (S16). Checking the sales stopping date among the read data (S17), and if the sales stopping date is included in the current week, this product is determined to be out of the target of forecasting.

Until the demand forecasting of data of all target products of demand forecasting is over, data is read from the product master F1, and steps S7 to S17 are repeated to forecast the demand of each product (S18). When the demand forecasting of all products is over, the forecasting data of 18 weeks before in the forecast result file F2 is deleted, and each file is closed (S19).

The obtained final forecasting result is shown on the display device 5 in a format of, for example, a table, and the user can obtain the forecasting value of high and stable precision without having consciousness of the neural network.

Together with the forecasting result, when the past forecasting value, actual sales results value, and forecasting precision are displayed, the user refers to the data as a judgement factor, and further considers the conditions such as weather and occurrence of an event, the forecasting result can be corrected by the mouse operation, for example, so that the production plan or distribution plan can be formed easily.

The network learning process is described below on referring to the flowcharts in FIG. 4 through FIG. 6. Learning is effected for the purpose of avoiding an increase in error as the forecasting value is largely deviated from the actual sales results value.

Obtaining variables of the operating environments of the demand forecasting system (S31), each file name necessary for learning (learning status managing file F8 of patterns A, B, C) is set (S32), the sales results data for 13 months of each product is read out from the product master F1, and the resulting sum file F9 is produced (S33).

The process time in the last learning step is shown on the display device 5, and the user is required to select whether to start learning (S34). When learning execution start is not selected, the process is over. When learning execution start is selected, the start time is displayed (S35), and the number of times of learning to be executed preset in the system is obtained (S36), and each file whose file name is set is opened (S37).

From the product master F1, the product code, sales stopping date, and marketing date of the product as the target of learning is read (S38). Upon checking the sales stopping date (S39), it is considered to be out of the target of learning when the sales stopping date is today.

The data of the learning status being output from the learning status managing file F8 (learning date, learning start time, learning end time, the number of learning times, the number of entered patterns, the number of convergence patterns, average error, maximum error, and maximum error pattern name) is displayed (S40).

If the sales result data is absent, then it is considered to be out of the target of learning (S41).

Weekly learning start process is done on each one of patterns A, B, C (S42).

Figure 6:
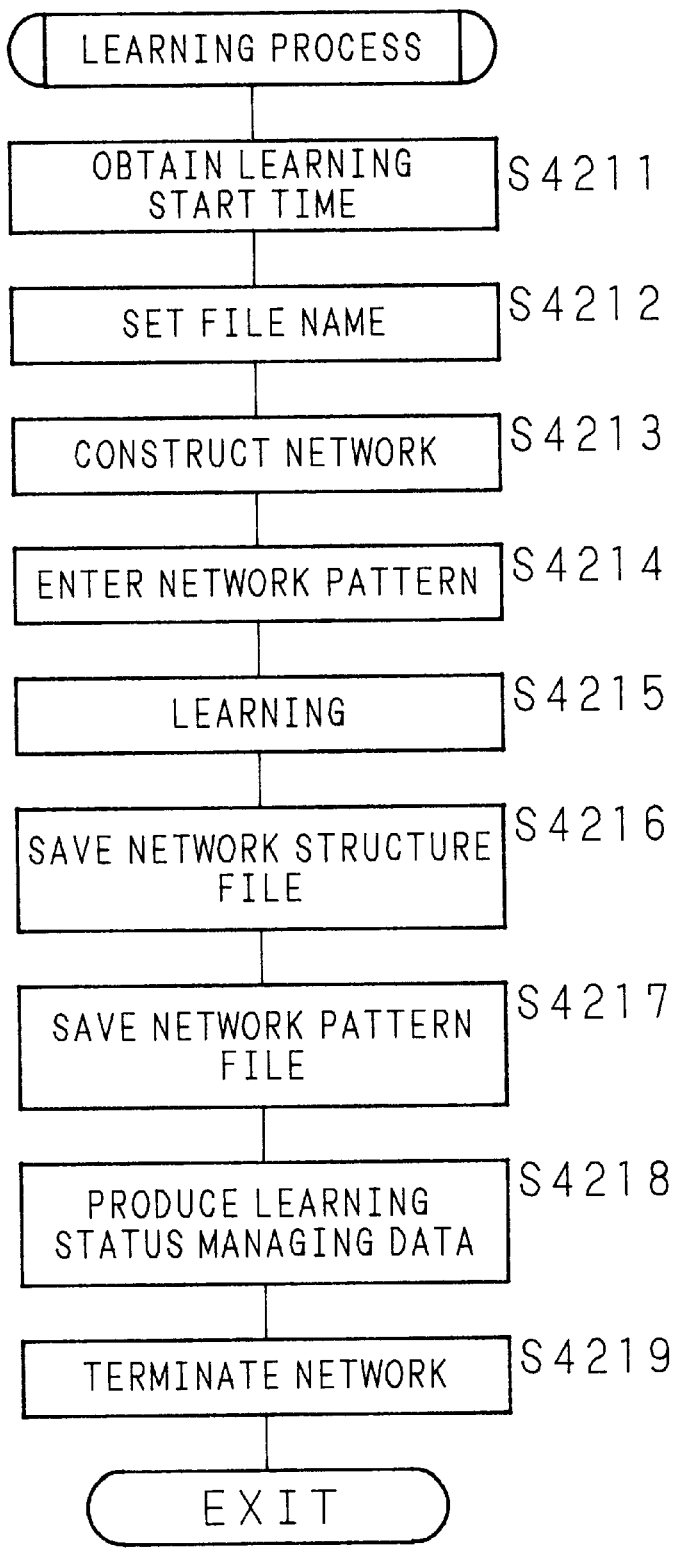
FIG. 6 is a flowchart of weekly learning process (3)

The procedure of weekly learning process in each pattern is as shown in FIG. 6, that is, obtaining the learning start time (S4211), the file name of each file necessary for weekly learning process by each pattern (network structure file F6, network pattern file F7 of patterns A, B, C) is set (S4212). Network is constructed by reading out structure data of the network from the network structure file F6 (S4213), and the network pattern read out from the network pattern file F7 is entered (S4214).

In this example, consequently, learning by sales results data for 13 months is executed by the number of times specified in the system (S4215). Storing the network structure obtained as a result of the learning, the network structure F6 file is saved (S4216). Storing the combination pattern of data used in learning, the network pattern file F7 is saved (S4217). Creating the learning status managing data (S4217), and storing the data in the learning status managing file F8, the file is saved, and the network is terminated (S4219).

Similar learning process is executed for all patterns (S421 to S423).

The data of the next product including the product code, marketing date and sales stopping date is read (S43). Checking the sales stopping date (S44), it is considered to be out of the target of learning when the sales stopping date is today.

The data of the learning status being read out from the learning status managing file F8 is displayed (S45).

Until reading of the data of all products as the target of learning from the product master F1 is over, learning is executed by repeating the above steps S41 to S45 (S46), and when reading of the data of all products is over, the structure data of network of patterns A, B, C constructed by learning is stored in each network structure file F6, and the combination pattern of the data used in the learning is stored in the network pattern file F7, and the learning status data of this time is stored in the learning status managing file of each pattern, and each file is closed (S47).

Figure 7:
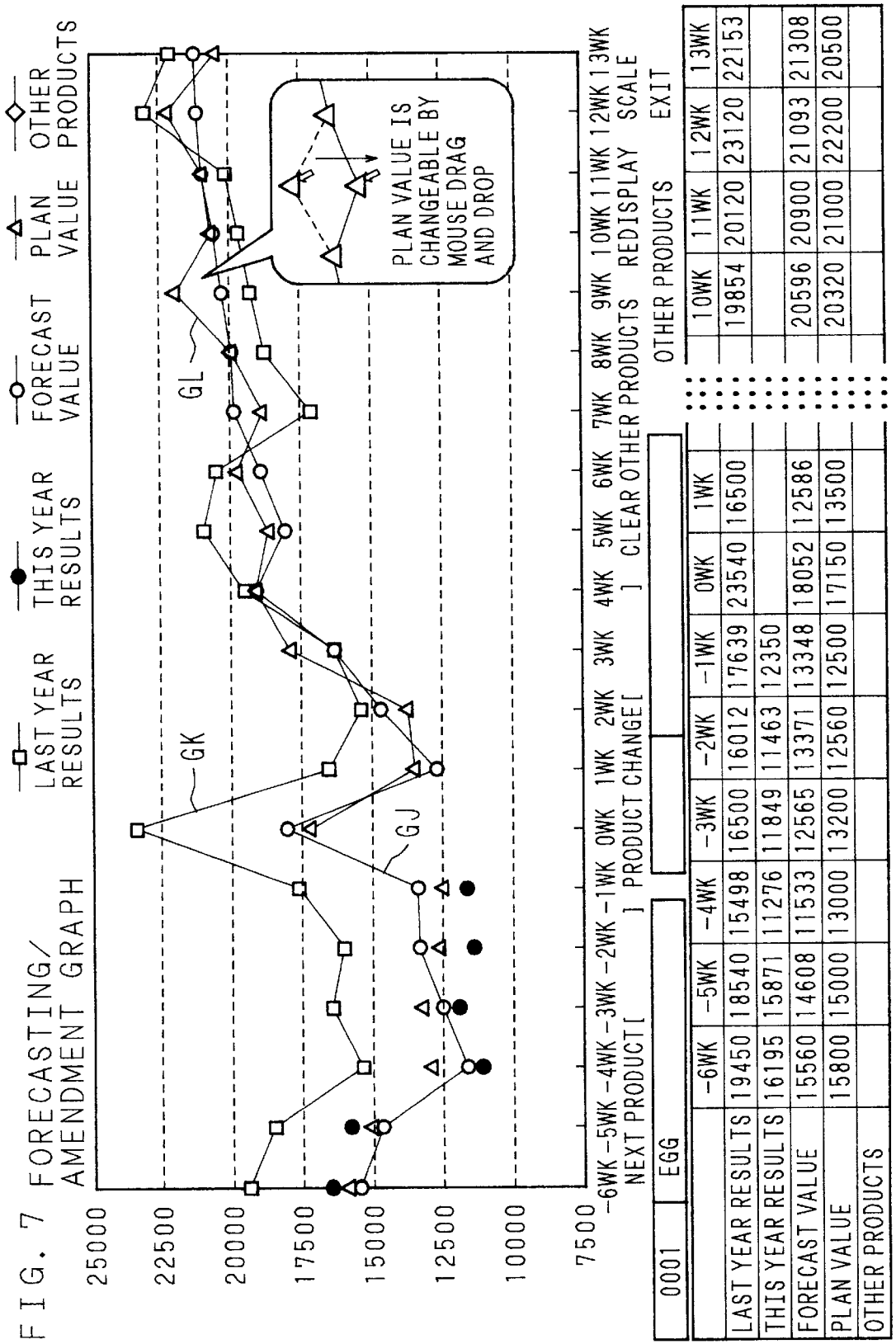
FIG. 7 is a diagram of a display example of forecasting data.

FIG. 7 is a diagram showing a display example of the output of the above-mentioned weekly forecasting data on the screen of the display unit 5. On the screen, a graph GJ of forecasting values, a graph GK of sales results of the same period of the last year, a graph GL of plan values in the future 13 weeks, and plan values (Δ) and results values (●) in the last 6 weeks are displayed. When the product is a new one, forecasting values of the new product are produced according to real sales results value of a similar product. The user can correct the sales plan easily on the screen by changing the plan value of the graph GL by drag and drop of the mouse.

In this example, the weekly forecasting result is reflected in monthly forecasting, but similarly the daily forecasting result may be reflected in weekly forecasting or monthly prediction, and the monthly forecasting result of may be reflected in yearly forecasting. Also, by executing weekly forecasting and monthly forecasting independently, it is also possible to compare the monthly forecasting by multiplying the weekly forecasting result, with the independent monthly forecasting, or to correct the result of forecasting.

Figure 8:
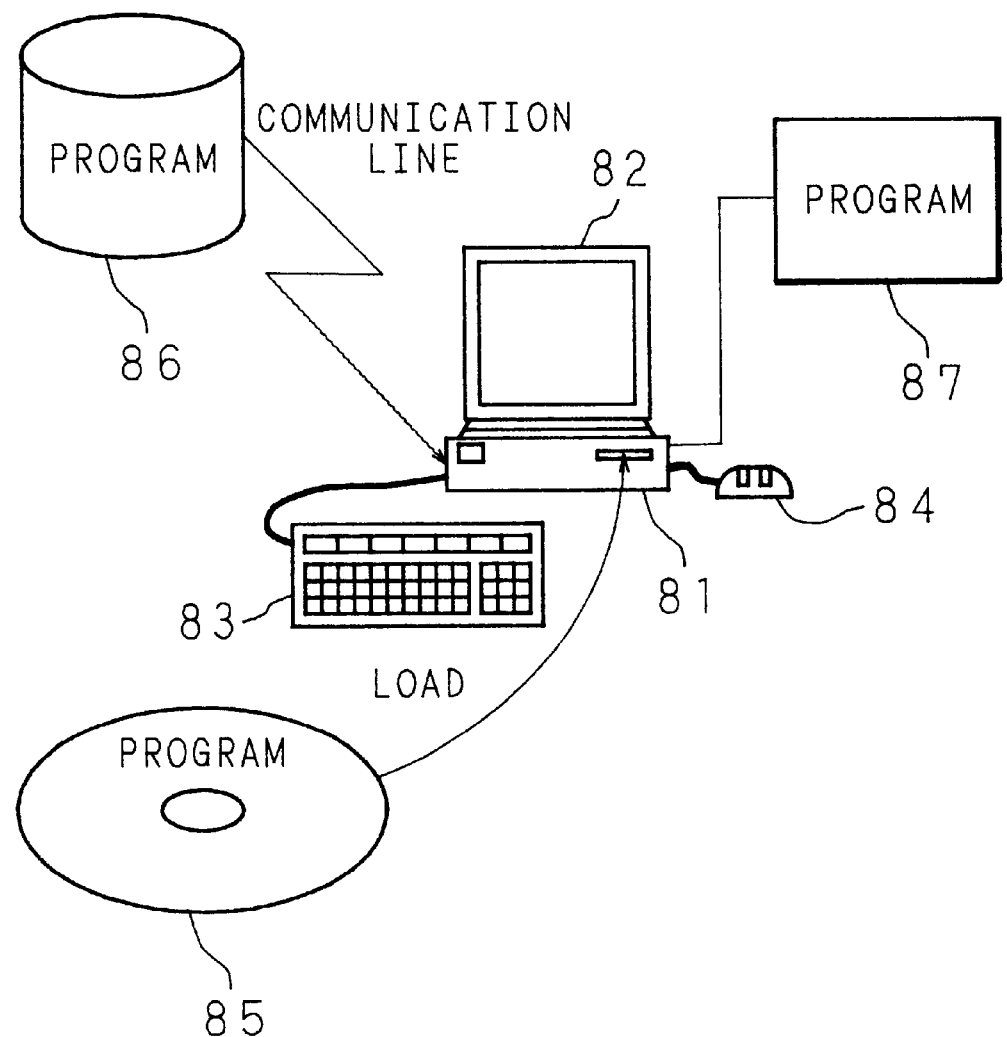
FIG. 8 is a schematic diagram showing a hardware constitution for realizing the system of the invention.

FIG. 8 is a schematic diagram showing a hardware configuration for realizing the system of the invention. This hardware comprises a personal computer 81 as a processing unit, a display unit 82 for displaying character data, etc., and a keyboard 83 and a mouse 84 as an input device. The personal computer 81 loads the program for executing such process from a portable recording medium 85 such as a magnetic disk and CD-ROM, a circuit destination memory 86 provided, for example, in the center capable of transmitting the program to the personal computer 81 by wireless or wire, or a memory of the personal computer 81, such as RAM, hard disk, and processing unit side memory 87.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

I claim:

1. A method for forecasting demand for a product based on sales results of the product, comprising:

setting plural models as a neural network;

identifying sales results of a first period;

inputting the identified sales results of the first period to each of the models to make the neural network of each model learn from inputs and produce data as close as possible to sales results of a second period following the first period;

storing a forecast demand value of a predetermined time outputted by each of the neural networks;

selecting a model from the learned neural networks which has a forecast demand value closest to the sales results of the predetermined time; and inputting latest sales results identified by the learned neural network corresponding to the selected model to forecast demand.

2. A demand forecasting method of claim 1, further comprising an outputting device outputting a calculated error between the sales results and demand forecasting result.

3. A method of claim 1, wherein said model is a model incorporating position data indicating period position on a calendar as a processing element, and the position data is fed in the neural network together with the sales results.

4. A method of claim 1, wherein said model is a model incorporating the position data indicating the position of a calendar period as a processing element, and the position data is fed in the neural network together with the sales results.

5. A demand forecasting system using the method of claim 4.

6. A demand forecasting system of claim 5, further comprising an output device outputting a calculated error between the sales results and demand forecasting result.

7. A method of claim 1, wherein the sales results used in learning of the neural network of 13 months dating back from a learning point is acquired.

8. A demand forecasting system using the method of claim 7.

9. A demand forecasting system of claim 8, further comprising an output device outputting the error between the sales results and demand forecasting result.

10. A method of claim 1, wherein demand forecasting in a first period unit forecast by the neural network is reflected in the demand forecasting in a second period unit composed of a set of first period units.

11. A demand forecasting system using the method of claim 10.

12. A demand forecasting system of claim 11, further comprising an output device for outputting the error between the sales results and demand forecasting result.

13. A computer readable storage media storing a process of forecasting the demand for a product on the basis of the sales results of the product comprising:

setting plural models as a neural network;

identifying sales results of a first period;

inputting the identified sales results of the first period to each of the models to make the neural network of each model learn from inputs and produce data as close as possible to the sales results of a second period following the first period;

storing a forecast demand value of a predetermined time outputted by each of the neural networks;

selecting a model from the learned neural networks which has a demand value closest to the sales results of the predetermined time; and inputting a latest sales results identified by the learned neural network corresponding to the selected model to forecast a demand.

14. A recording medium of claim 13, wherein said model is a model incorporating a position data indicating position of a calendar period as a processing element, and further including program code means for causing said computer to feed the position data in the neural network together with the sales results.

15. A recording medium of claim 13, wherein the identifying sales results includes acquiring results of 13 months dating back from the learning point.

16. A recording medium of claim 13, further including causing said computer to reflect the demand forecasting in a first period unit forecast by the neural network in the demand forecasting in a second period unit composed of a set of the first period units.

17. A recording medium of claim 14, wherein identifying sales results includes acquiring results of 13 months dating back from the learning point.

18. A recording medium of claim 14, further comprising reflecting the demand forecasting in a first period unit forecast by the neural network in the demand forecasting in a second period unit composed of a set of the first period units.

19. A recording medium of claim 5, further comprising reflecting the demand forecasting in a first period unit forecast by the neural network in the demand forecasting in a second period unit composed of a set of the first period units.

20. A demand forecasting method comprising:

creating a plurality of neural network models to forecast demand based on different time periods;

identifying sales results of a first period and entering the results into each of the models to allow each model to learn and forecast demand for a second period;

comparing the forecast demand from each of the models for the second period with actual sales results to compute an error of each model; and selecting the model with the smallest error.

21. A computer readable storage medium storing software to implement a demand forecasting method performing;

creating a plurality of neural network models to forecast demand based on different time periods;

identifying sales results of a first period and entering the results into each of the models to allow each Model to learn and forecast demand for a second period;

comparing the forecast demand from each of the models for the second period with actual sales results to compute an error of each model; and selecting the model with the smallest error.

22. A demand forecasting system comprising:

neural network models forecasting demand based on different time periods;

an inputting device inputting sales results of a first period into each of the models;

a comparing device comparing a forecast demand from each of the models for a second period with actual sales results to compute an error of each model; and a selecting device selecting the model with the smallest error.

* * * * *

UNITED STATES PATENT AND TRADEMARK OFFICE
CERTIFICATE OF CORRECTION

PATENT NO.: 6,032,125
DATED : February 29, 2000
INVENTOR(S): Hideyuki ANDO

It is certified that errors appear in the above-identified patent and that said Letters Patent is hereby corrected as shown below:

Col. 9, line 23, after "wherein" insert --the--.

Col. 10, line 17, change "Model" to --model--.

Signed and Sealed this

Thirteenth Day of February, 2001

NICHOLAS P. GODICI

*Attest:*

*Attesting Officer*     *Acting Director of the United States Patent and Trademark Office*